Feb. 13, 1945.  M. A. TREUHAFT  2,369,499
APPARATUS FOR MEASURING RATE OF CHANGE
Filed Dec. 5, 1940
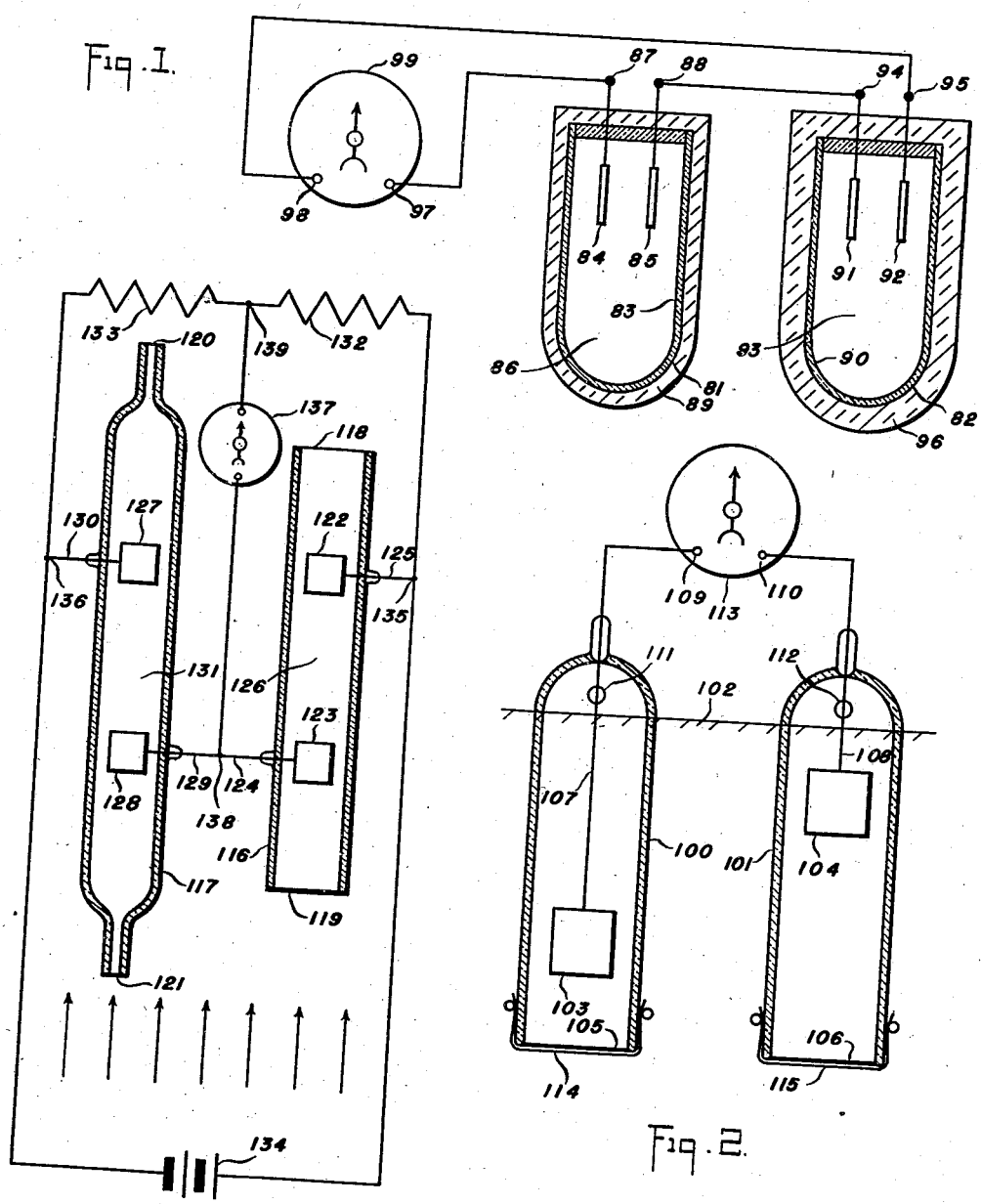
INVENTOR
Milton A. Treuhaft Patented Feb. 13, 1945

2,369,499

UNITED STATES PATENT OFFICE 2,369,499

APPARATUS FOR MEASURING RATE OF CHANGE

Milton A. Treuhaft, Weehawken, N. J., assignor to John C. Batchelor

Application December 5, 1940, Serial No. 368,591

4 Claims. (Cl. 73—432)

This invention relates to the art of instrumentation, and more particularly to the detection of the rates at which physical functions are changing. Although the invention is of broad application to changing physical functions in general, a specific application is described herein in which the invention is especially important. Among these are the measurement of rates of change of temperature, conductivity and ionic concentration.

A common method of detecting and measuring rates of change is to measure the physical function at desired intervals and divide the difference of the readings by the elapsed time between them. Such a procedure is often laborious, and significant changes may be overlooked unless readings are taken at frequent intervals over a considerable period. Therefore an instrument for the direct indication of rates of change is highly desirable.

Apparatus has heretofore been suggested for the detection of rates of change. Such apparatus has been relatively elementary and crude, and has been capable of detecting rates of change only of relatively great magnitudes and of simple functions such as accelerations of motion, rates of aircraft climb, and the like.

Accelerations, which are nothing more than rates of change of velocity, have frequently been measured by simple inertia devices. For example, a vertically hanging pendulum will suffer an angular displacement away from the vertical when a horizontal acceleration is impressed upon it: The extent of this angular displacement will be a function of the acceleration which is imparted to the pendulum. A typical embodiment of an accelerometer employing this principle is shown in United States Patent 1,280,508, and in many others.

Rates of aircraft climb have also frequently been measured by measuring the rate at which atmospheric pressure is changing during climbing flight. The space within a closed container having atmospheric access only through a restricted passage will not follow changes in atmospheric pressure instantaneously. Accordingly, when the atmospheric pressure changes, a temporary pressure difference will exist between the space within the container and atmospheric pressure, which will be greater as the rate at which atmospheric pressure is changing becomes greater. Measurement of this pressure difference will afford an indication of the rate at which the pressure about the instrument is changing. A typical embodiment of this kind of apparatus is described in United States Patent 1,338,358 and others.

In view of the shortcomings of existing apparatus, it is a general object of my invention to provide apparatus capable of almost universal application to the detection of the rate at which any physical function is changing, and new concepts have resulted which make possible the realization of an instrument of greater sensitivity than has previously been considered attainable. For example, I have actually constructed and operated apparatus in accordance with my invention which has successfully measured rates of temperature change as small as 0.07 degree centigrade per hour.

It is well known that the rate at which any function, $y = f(t)$, is changing is given by the first derivative of that function with respect to time; thus, the derivative of this function at the time $t = t_1$ is $$\frac{dy}{dt} = \lim_{t_2 \longrightarrow t_1} \frac{f(t_2) - f(t_1)}{t_2 - t_1} = \lim_{t \longrightarrow 0} \frac{\Delta y}{\Delta t}$$

and to a fairly good approximation, $$\frac{dy}{dt} \simeq \frac{f(t_2) - f(t_1)}{t_2 - t_1} \simeq \frac{\Delta y}{\Delta t}$$

Where $t_2 - t_1$, or $\Delta t$ is small, no appreciable error will result, and $\Delta y/\Delta t$ may be taken as a commercially acceptable index of the rate at which a function is changing.

In accordance with one form of my invention which can be made very sensitive, I provide detecting means responsive to the value of a physical function which is subject to variations with respect to time, and further provide delaying means for delaying the effect of that function to two different degrees. I then employ means for producing a resultant physical manifestation corresponding at any instant to the difference between the contemporaneous values of the two delayed functions.

A first delay is important in order to provide a certain integrating period to remove the effect of minor variations in the physical function which are not significant and which would adversely affect the usable sensitivity of the instrument. This first delay may be selected in view of the conditions surrounding the function whose rate of change is to be measured so that it is long enough to yield the desired integration yet short enough so that significant changes are not ironed out. For some applications, for example, where minor variations are of small magnitudes or where high sensitivity is not required, the first delay may be omitted.

With two delays as just mentioned having delaying times of $t_2$ and $t_1$, the value of the function will in effect be measured continuously at two different times separated by an interval $t_2-t_1$, and a physical manifestation corresponding to the difference between the two measurements will result which may be written as $f(t_2)-f(t_1)$. Now since $$\frac{dy}{dt} \simeq \frac{f(t_2)-f(t_1)}{(t_2-t_1)}$$

and since $(t_2-t_1)$ may usually be maintained constant, then $$\frac{dy}{dt} \simeq \frac{1}{K}[f(t_2)-f(t_1)]$$

where $K=(t_2-t_1)$.

Thus, a physical manifestation corresponding to $f(t_2)-f(t_1)$ will also correspond to $dy/dt$ and will therefore be an index of the value of the rate at which the function is changing.

When my new philosophy of rate of change measurement is applied to produce rates of change measuring instruments, of which typical examples are described hereinafter, apparatus result which are capable of detecting equilibria almost as soon as they are reached and without waiting for an appreciable integrating time; of detecting incipient instabilities before they have had an opportunity to reach undesirable magnitudes; and of detecting maxima and minima of varying functions at the time of their occurrence rather than in retrospect. Moreover, the availability of my apparatus makes possible more accurate prognostication by determining an essentially instantaneous trend without awaiting the passage of a substantial time previously required to determine the slope of a curve of a function.

In order to describe my invention more fully, I shall refer to the accompanying drawings in which:

Figure 1 shows apparatus for measuring a rate of temperature change; and

Figures 2 and 3 represent two forms of apparatus suitable for measuring the rate of change of concentration of an electrolyte.

The measurement of the rate at which a temperature is changing is frequently desirable, and may readily be accomplished in accordance with my invention by employing the apparatus shown in Figure 1.

This apparatus comprises essentially a pair of similar electromotive force generating cells 81, 82 chosen to be of any desired type whose output potential varies with the temperature of the cell. In the illustrated embodiment, the first cell 81 comprises a container 83 having a pair of dissimilar electrodes 84 and 85 and filled with an appropriate electrolyte 86 to cooperate with the electrodes to produce an electrical potential difference between the terminals 87, 88. The cell 81 is provided with a moderate amount of thermal insulation 89 to provide a predetermined time delay before the electrolyte 86 will reach the temperature of the medium in which the cell 81 may be immersed.

Similarly, the cell 82 comprises a container 90 having disposed therein a pair of dissimilar electrodes 91, 92 and filled with the electrolyte 93 so that a second potential difference will be caused to exist between the terminals 94 and 95. Usually the electrodes of both cells will be the same, and the electrolyte of both cells will be the same. The container 90 is provided with somewhat larger amount of thermal insulation 96 than the other container 83 to produce greater time delay before the electrolyte 93 will reach the temperature of the medium in which the cell 82 may be immersed.

The cells 81 and 82 are connected in series opposition in such a way that when the cells are at the same temperatures, their generated potentials will be equal and mutually opposite so that no potential difference will exist between the terminals 97, 98. The cells 81 and 82 are also mutually disposed so that they may be exposed to a medium whose rate of temperature change is to be measured and so that they may both be permitted to follow that temperature change without spurious effects from convection currents and the like.

If, now, after an equilibrium condition has been established, the temperature of the medium surrounding the cells 81, 82 is changed, a new equilibrium temperature will be reached by the cell 81 before it is reached by the cell 82 so that momentarily the potential difference between the terminals 87, 88 will differ from that between the terminals 94, 95 so that a potential difference will result between the terminals 97, 98. The potential sensitive instrument 99 connected to the terminals 97, 98 will indicate the potential difference, which will be a function of the rate at which the temperature of the medium is changing.

Some evidence of the breadth of applications of my new concept of rate of change determination may be drawn from the apparatus disclosed in Figures 2 and 3, comprising apparatus adapted to measure the rate of change of ion concentration in an electrolytic solution of an ionizable chemical compound or the like.

It is well known that when two electrodes of a similar metal are immersed in a solution whose ions correspond to the metal of the electrodes and when the concentration of the ions is greater in the neighborhood of one electrode than of the other, an electromotive force will be generated between the two electrodes.

Referring now specifically to Figure 2, I have provided a pair of insulating tubes 100 and 101 open at at least one end, these tubes being adapted for immersion in an electrolyte 102 whose rate of concentration change is to be detected. A pair of electrodes 103 and 104 are mounted in the tubes 100 and 101 respectively, but at different distances from the respective openings 105 and 106. The electrodes 103 and 104 are composed of a metal corresponding to the ions whose rate of change of concentration is to be measured. Conducting leads 107 and 108 are provided connecting the electrodes 103 and 104 to the terminals 109 and 110 between which any potential generated by the cooperation of the electrodes and the electrolyte may appear. A pair of openings 111 and 112 are provided in the tubes 100, 101 to prevent air locks.

An indicator 113 is provided for detecting the potential difference between the terminals 109 and 110. When it is desired to discriminate against circulation and convection, etc., permeable or semi-permeable membranes 114 and 115 may be placed over the ends of the tubes containing the electrodes. These membranes may be omitted in suitable cases, if desired, or they may be provided with unequal permeabilities to provide desired time delays in ionic access to the electrodes 103, 104, instead of or in addition to relying on the different spacings from the openings 105, 106 to the electrodes 103, 104.

For the purpose of illustration, let us assume that the solution in question contains only one type of anion and one type of cation. Then, when the ionic concentration of the electrolyte immediately adjacent the openings 105 and 106 increases as a result, for example, of the addition of more solute, this increased number of ions will gradually diffuse into the electrolyte contained within the tubes 100 and 101, but will reach the nearer electrode 103 before reaching the farther electrode 104. In other words, two different time delays will be introduced in the establishment of ionic equilibria at the electrodes 103 and 104.

During the period of time when the concentration of ions adjacent the electrode 103 is greater than that adjacent the electrode 104, a potential difference will be created between the terminals 109 and 110, and this potential difference will vary as the rate at which the ionic concentration adjacent the openings 105 and 106 is changing. The indicator 113 will thus measure the rate at which the ionic concentration is changing. After a concentration change and complete diffusion have been effected, an equilibrium condition will exist whereat the ionic concentration about each electrode is equal and hence no potential difference will exist between the terminals 109 and 110. Thus, zero rate of change will be indicated on the indicator 113.

It will be seen that the reverse of this mode of operation will exist when the ionic concentration of the electrolyte adjacent the openings 105 and 106 is decreased as a result, for example, of the addition of more solvent. Under this circumstance, ions will diffuse out of the solution then contained in the tubes 100 and 101, but the ionic concentration immediately adjacent the electrode 103 will decrease more quickly than that immediately adjacent the electrode 104. Thus, a potential opposite to that generated when the ionic concentration was increased will be generated between the electrodes 103 and 104 and will consequently be impressed upon the terminals 109 and 110. Accordingly, the indicator 113 will produce an indication in the opposite sense from that produced when the concentration was increased.

Still further, the time constant in this embodiment will frequently be affected by the fact that current flowing in the circuit including the electrodes and the indicator will itself operate to cause the migration of ions in a direction which assists diffusion to create an equilibrium. Proper allowance can readily be made for this added factor, however, by calibration of the meter, or otherwise.

Figure 3 illustrates a modified form of rate of concentration change detection apparatus operating on a conductivity principle, to which reference is now made. A pair of tubes, 116 and 117, of any appropriate material such as glass are provided, the first tube 116 having relatively wide openings 118 and 119 through which a fluid medium may have relatively ready access to the inside thereof. The tube 117, on the other hand, is provided with relatively restricted openings 120 and 121 through which that fluid medium can obtain only relatively slow access to the space within the tube.

The tube 116 is provided with a pair of electrodes 122, 123, which may be of any suitable material, such as nickel, carried on the lead-in wires 125, 124 to produce what may be considered to be a conductivity cell 126 capable of measuring the electrical conductivity of a column of fluid contained in the tube 116 between the electrodes 122, 123. The tube 117 is likewise provided with a pair of electrodes 127, 128 and likewise carried on the lead-in wires 130, 129 to constitute a second conductivity cell 131. Construction of the instrument and measurements therewith are usually simplified by making the geometrical configuration and the correlation of the electrodes in the two tubes almost identical, but dissimilar structures may be employed when circumstances so dictate.

The two conductivity cells 126 and 131 are associated in a conjugate network with the resistors 132 and 133. This network is energized by an appropriate energy source 134, shown in this instance as a battery connected across one pair of conjugate terminals 135 and 136. A potential sensitive instrument 137 is provided across the other pair of conjugate terminals 138 and 139 to detect any unbalance of the bridge circuit constituted by this apparatus. In operation, the resistors 132, 133 are so adjusted that when the conductivity cells 126 and 131 contain identical electrolytic solutions, no potential will exist across the terminals 138, 139, and the instrument 137 will remain undeflected. Thus, if the cells 126 and 131 are immersed in a substantially homogeneous electrolytic solution and an equilibrium condition is permitted to be reached, no deflection of the instrument 137 will occur. If now the concentration of the fluid medium is changed, as by adding solute, for example, the concentration of the electrolyte within the cells 126 and 131 will be changed by molecular diffusion, thermal convection, and for other reasons. In the embodiment shown in the diagram, the concentration within the cell is changed principally by circulation, as indicated by the arrows. The cell 126, however, to which fluid access through the openings 118 and 119 is relatively easy, will reach a new equilibrium condition relatively promptly. The cell 131, on the other hand, offering relatively restricted access through the openings 120 and 121 will arrive at equilibrium considerably more slowly. Thus, a time delay will exist in the arrival of one cell at equilibrium over the other, so that a substantial interval will exist during which the bridge circuit will be unbalanced and a potential will exist across the terminals 138, 139 to energize the instrument 137.

If now the concentration of the fluid medium is decreased, as by adding solvent, for example, an opposite routine will occur in which the concentration within the cell 131 will decrease more slowly than that within the cell 126 and a deflection in the opposite direction on the instrument 137 will be caused. If, moreover, the concentration of the fluid medium surrounding the cells 126 and 131 is changing more or less continuously, a continuous unbalance will exist varying in magnitude in accordance with the changing concentration, and the magnitude of the signal appearing across the terminals 138, 139 and energizing the instrument 137 will be a function of the rate at which the concentration is changing.

It will be understood that in the detection of rates of temperature change, my detector need not be in physical contact with the medium being investigated. For example, radiant energy from the medium may be caused to fall upon the detector. Moreover, if the thermal output of the medium remains constant, my detector may be used to measure the rate of change of opacity or transmittance of a substance or the space between the source and the detector.

The foregoing description of the general concepts of my invention, taken in conjunction with the various specific embodiments illustrated, will indicate the wide range of applicability of the invention. It will be particularly understood that the invention can be applied to measure the rates of change of physical functions other than those specifically mentioned. Furthermore, in the measurement of rates of change of the physical functions specifically mentioned, apparatus differing widely from the specific embodiments shown may be devised by those skilled in the art, within the broader aspects of the invention. Also, the specific embodiments shown are subject to considerable variation as will be apparent to those skilled in the art.

I claim:

1. Apparatus for measuring the rate of change of temperature of a medium which comprises first and second electromotive force generating cells constructed and adapted to generate electrical potentials which vary in accordance with the temperatures of the respective cells, heat conducting means for modifying the temperature of said first cell at a predetermined rate in accordance with the temperature of said medium; second heat conducting means for modifying the temperature of said second cell in accordance with the temperature of said medium but with a predetermined time delay with respect to the temperature of said first cell, and means for measuring the difference between the potentials generated by said cells to thereby measure the rate at which the temperature of said medium is changing.

2. Apparatus for measuring the rate of change of the temperature of a medium which comprises first and second electro-motive force generating cells constructed and adapted to generate electrical potentials which vary in accordance with the temperatures of the respective cells, means for bringing the temperature of said first cell to the temperature of said medium with a predetermined time delay, means for bringing the temperature of said second cell to the temperature of said medium with a second predetermined time delay, and means for measuring the difference between the potentials generated by said cells.

3. Measuring apparatus comprising first and second electricity generating devices connected in series opposition, a first coating of thermal insulation on said first generating device having a first thermal impedance, a second coating of thermal insulation on said second generating device having a second and different thermal impedance and means for measuring the terminal voltage of the series circuit comprising said first and second generating devices.

4. Apparatus for measuring the rate of change of a physical function which comprises a first electrolytic signal-producing cell sensitive to said physical function to produce signals proportional thereto, first communicating means associated with said first element for conducting said function thereto at a predetermined rate, a second electrolytic signal-producing cell sensitive to said physical function to produce signals proportional thereto, second communicating means associated with said second element and having a predetermined finite speed of transmission of said physical function for conducting said function to said second element with a predetermined time delay, and measuring means for determining the instantaneous difference between the magnitudes of the signals produced by said first and second signal-producing elements.

MILTON A. TREUHAFT.